US007796569B2

(12) United States Patent
Kim et al.

(10) Patent No.: US 7,796,569 B2
(45) Date of Patent: Sep. 14, 2010

(54) DIGITAL BROADCASTING RECEPTION APPARATUS FOR QUICK CHANNEL SWITCHING AND METHOD THEREOF

(75) Inventors: Hark-Sang Kim, Daegu (KR);
Yeong-Moo Ryu, Gumi-si (KR);
Seok-Hyo Park, Gumi-si (KR); Jun Yoon, Gumi-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 695 days.

(21) Appl. No.: 11/746,550

(22) Filed: May 9, 2007

(65) Prior Publication Data

US 2008/0002630 A1    Jan. 3, 2008

(30) Foreign Application Priority Data

Jun. 30, 2006   (KR) ...................... 10-2006-0061116

(51) Int. Cl.
*H04B 7/212* (2006.01)
(52) U.S. Cl. ....................................... 370/337; 370/431
(58) Field of Classification Search ........................ None
See application file for complete search history.

(56) References Cited

U.S. PATENT DOCUMENTS

| 6,591,013 | B1* | 7/2003 | Taunton ...................... 382/233 |
| 2004/0160974 | A1* | 8/2004 | Read et al. .................. 370/431 |
| 2004/0194134 | A1 | 9/2004 | Gunatilake et al. |
| 2006/0085828 | A1 | 4/2006 | Dureau et al. |
| 2007/0049223 | A1* | 3/2007 | Nishizawa et al. ....... 455/182.3 |

FOREIGN PATENT DOCUMENTS

| EP | 1 575 285 A2 | 9/2005 |
| JP | 2006-074241 A | 3/2006 |
| JP | 2006074241 A | 3/2006 |
| KR | 100182004 B1 | 12/1998 |
| KR | 1020040038280 A | 5/2004 |
| KR | 1020040063381 A | 7/2004 |
| KR | 10-2005-0025790 A | 3/2005 |
| KR | 1020050025790 A | 3/2005 |
| WO | WO 99/09741 A1 | 2/1999 |
| WO | WO 00/57646 A1 | 9/2000 |

* cited by examiner

*Primary Examiner*—Lester Kincaid
*Assistant Examiner*—Phuoc Doan
(74) *Attorney, Agent, or Firm*—Jefferson IP Law, LLP

(57) ABSTRACT

Disclosed is a method for switching broadcasting channels in a digital broadcasting reception apparatus employing a time division multiplexing scheme. The method includes receiving and demodulating digital broadcasting data according to at least one broadcasting channel serviced in a frequency band used by the broadcasting station when the broadcasting channel of a predetermined broadcasting station is selected, outputting the digital broadcasting data of the selected broadcasting channel among the demodulated digital broadcasting data according to the broadcasting channels, storing digital broadcasting data according to the broadcasting channels except the selected broadcasting channel, and when there is a request for switching one of the broadcasting channels serviced by the broadcasting station, retrieving and outputting the digital broadcasting data of the requested broadcasting channel among the stored data. Since it is possible to quickly switch broadcasting channels in the apparatus during output of the digital broadcasting, the convenience for users is improved.

16 Claims, 4 Drawing Sheets

DIGITAL BROADCASTING RECEPTION APPARATUS FOR QUICK CHANNEL SWITCHING AND METHOD THEREOF

PRIORITY

This application claims the benefit under 35 U.S.C. §119 (a) of a Korean patent application filed in the Korean Industrial Property Office on Jun. 30, 2006 and assigned Serial No. 2006-61116, the entire disclosure of which is hereby incorporated by reference.

BACKGROUND OF THE INVENTION

1. Field of the Invention

The present invention relates to a digital broadcasting reception apparatus. More particularly, the present invention relates to a digital broadcasting reception apparatus capable of quickly switching channels in a digital broadcasting system employing a time division multiplexing scheme and a method thereof.

2. Description of the Related Art

A broadcasting system, such as a digital video broadcasting-handheld (DVB-H) which compresses digital broadcasting data including audio and video data in units of certain packets and broadcasts the data just as a wired/wireless Internet does, multiplexes digital broadcasting data according to each of the broadcasting channels through a time division multiplexing scheme. The time division multiplexing scheme refers to a scheme of transmitting the digital broadcasting data according to the broadcasting channels by packetizing the capacity of transmission path into time slots, for example, time intervals and carrying the packetized data on the each time slot.

Accordingly, in the digital broadcasting system employing a time division multiplexing scheme, broadcasting stations simultaneously broadcast digital broadcasting data according to at least one broadcasting channel in a frequency band, used by each of the broadcasting stations, at a fixed cycle.

FIG. 1 is a view illustrating an example of a digital broadcasting data according to a channel broadcast through a time division multiplexing scheme.

In FIG. 1, it is assumed that there are five channels, for example, A, B, C, D and E serviced in a frequency band used by a predetermined broadcasting station. For example, channels where KBS broadcasting station broadcasts correspond to KBS1, KBS2, KBS sport, KBS movie and KBS drama.

In this case, the broadcasting station packetizes digital broadcasting data according to each of the broadcasting channels respectively, and broadcasts the packet data according to a predetermined order of the channels cyclically. A digital broadcasting reception apparatus modulates only the digital broadcasting data based on the broadcasting channel which a user has selected among cyclically received digital broadcasting data according to the broadcasting channels, and outputs the data.

However, when the digital broadcasting reception apparatus outputs the digital broadcasting data of the channel A in FIG. 1, in the case where a user requests a channel switching into channel B, if a point of time when the channel switching is requested corresponds to a point of time when the digital broadcasting data of channel B is received, there is no problem. However, if the time of requesting the channel switching is posterior to the time of receiving the digital broadcasting data of channel B, the digital broadcasting reception apparatus is not capable of immediately switching the channel, and only after receiving at least the digital broadcasting data of channel B of the next cycle, it is possible to switch the channel.

Further considering a process time during which the digital broadcasting data of the corresponding broadcasting channel is demodulated and output, it is inconvenient in that a user has to wait for a very long time to view the channel-switched broadcasting scene.

SUMMARY OF THE INVENTION

Accordingly, the present invention has been made to address the above-mentioned problems occurring in the prior art, and an aspect of the present invention is to provide a digital broadcasting reception apparatus for quickly switching channel and a method thereof.

In accordance with an aspect of the present invention, a method for switching broadcasting channels in a digital broadcasting reception apparatus employing a time division multiplexing scheme is provided, which receives digital broadcasting data according to at least one broadcasting channel serviced in a frequency band, used by each of the broadcasting stations, at a fixed cycle. The method includes receiving and demodulating digital broadcasting data according to at least one broadcasting channel serviced in a frequency band used by the broadcasting station when the broadcasting channel of a predetermined broadcasting station is selected, outputting the digital broadcasting data of the selected broadcasting channel among the demodulated digital broadcasting data according to the broadcasting channels, storing digital broadcasting data according to the broadcasting channels except the selected broadcasting channel, and when there is a request for switching one of the broadcasting channels serviced by the broadcasting station, retrieving and outputting the digital broadcasting data of the requested broadcasting channel among the stored digital broadcasting data.

In accordance with another aspect of the present invention, a digital broadcasting reception apparatus employing a time division multiplexing scheme is provided, which receives digital broadcasting data according to at least one broadcasting channel serviced in a frequency band used by each of the broadcasting stations, at a fixed cycle. The apparatus includes a digital broadcasting receiver for receiving digital broadcasting data according to at least one broadcasting channel serviced in a frequency band used by the broadcasting station when the broadcasting channel of a predetermined broadcasting station is selected, a demodulator for demodulating the received digital broadcasting data, an output unit for outputting the digital broadcasting data of the selected broadcasting channel among the demodulated digital broadcasting data according to the broadcasting channels, a storage unit for storing digital broadcasting data according to the broadcasting channels except the selected broadcasting channel, and a controller for, when there is a request for switching one of the broadcasting channels serviced by the broadcasting station, retrieving and outputting the digital broadcasting data of the requested broadcasting channel among the digital broadcasting data stored in the temporary storage unit according to the broadcasting channels.

BRIEF DESCRIPTION OF THE DRAWINGS

The above and other aspects, features and advantages of the present invention will be more apparent from the following detailed description taken in conjunction with the accompanying drawings, in which.

Throughout the drawings, like reference numerals will be understood to refer to like parts, components and structures.

DETAILED DESCRIPTION OF EXEMPLARY EMBODIMENTS

The following description with reference to the accompanying drawings will be provided to assist in a comprehensive understanding of the exemplary embodiments of the invention as defined by the claims and their equivalents. It includes various specific details to assist in that understanding but these are to be regarded as merely exemplary. Accordingly, those skilled in the art will recognize that various changes and modifications of the embodiments described herein can be made without departing from the scope and spirit of the invention. Also, descriptions of well-known functions and constructions will be omitted for clarity and conciseness.

Figure 1:
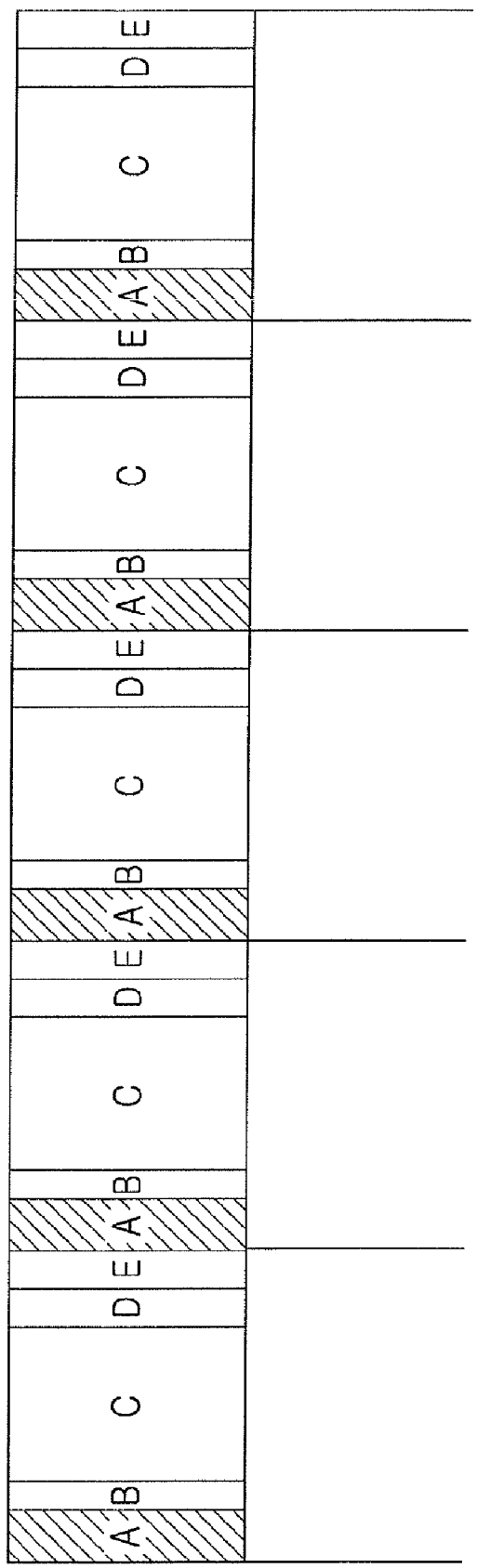
FIG. 1 is a view illustrating an example of a digital broadcasting data according to the channel broadcast through a time division multiplexing scheme.
Figure 2:
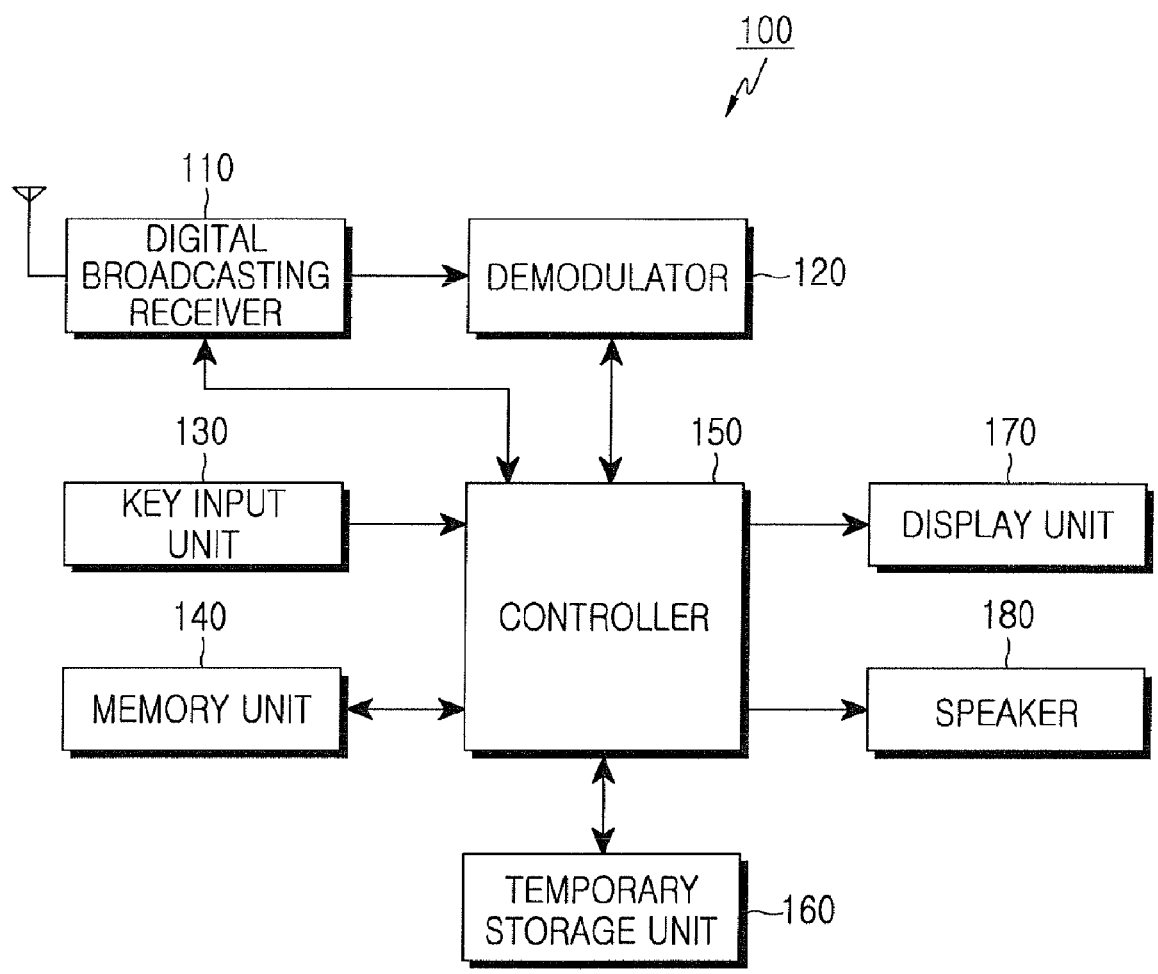
FIG. 2 illustrates a block diagram of a digital broadcasting reception apparatus according to an exemplary embodiment of the present invention.

FIG. 2 illustrates a block diagram of a digital broadcasting reception apparatus according to an exemplary embodiment of the present invention. It is assumed that the digital broadcasting reception apparatus according to an exemplary embodiment of the present invention corresponds to a digital broadcasting reception apparatus employing a time division multiplexing scheme for receiving at a fixed cycle digital broadcasting data according to at least one broadcasting channel serviced in a frequency band used by each of the broadcasting stations.

The illustrated digital broadcasting reception apparatus 100 includes a digital broadcasting receiver 110, a demodulator 120, a key input unit 130, a memory unit 140, a controller 150, a temporary storage unit 160, a display unit 170, and a speaker 180.

When a broadcasting channel of a broadcasting station is selected by control of the controller 150, the digital broadcasting receiver 110 receives digital broadcasting data according to at least one broadcasting channel serviced in a frequency band used by the broadcasting station, and outputs the data to the demodulator 120.

The demodulator 120 demodulates the received digital broadcasting data and outputs the demodulated data as digital broadcasting data streams. For the purpose of performing a fast data demodulation, the demodulator 120 also has a cache memory (e.g., static random access memory (SRAM)) for a deinterleaving and error correction process inside the demodulator 120, and performs the error correction process for the digital broadcasting data according to the broadcasting channels.

The key input unit 130 receives a user operation signal like a key input and transfers the signal to the controller 150.

The memory unit 140 stores various information necessary for controlling operations of the digital broadcasting reception apparatus 100. The memory unit 140 also stores starting point information that indicates the time when the digital broadcasting data according to the broadcasting channels is received. In an exemplary embodiment, the starting point information is detected from the digital broadcasting data according to the broadcasting channels under the control of the controller 150. As an example, the starting point information is included in the header of the digital broadcasting data of each of the broadcasting channels, wherein the data is transmitted in the scheme of time division multiplexing. The starting point information refers to a time value for the starting time of the time slot of each of the broadcasting channels, that is, a time value for the time when the digital broadcasting data according to each of the broadcasting channels is broadcast.

Meanwhile, the controller 150 stores the starting point information of the digital broadcasting data of each of the broadcasting channels in the memory unit 140 by receiving the digital broadcasting data according to each of the broadcasting channels based on the corresponding starting time. By storing the starting point information, the apparatus 100 is able to reduce an electricity consumption of the SRAM that the demodulator 120 operates for the purpose of processing the demodulation of the digital broadcasting data.

The controller 150 controls the overall operations of the digital broadcasting reception apparatus 100 according to an exemplary embodiment of the present invention. The controller 150 also demodulates the digital broadcasting stream output from the demodulator 120, and then outputs the stream to the display unit 170 and a speaker 180 through a video signal processor (not shown here) and an audio signal processor (not shown here). The display unit 170 and the speaker 180 fulfill functions as output units in the environment of the present invention.

The controller 150 converts the digital broadcasting reception apparatus 100 into the digital broadcasting reception mode when there is a request for digital broadcasting reception by a user. When a broadcasting channel of a broadcasting station is selected in the digital broadcasting reception mode, the controller 150 receives and demodulates the digital broadcasting data of all broadcasting channels serviced in a frequency band used by the broadcasting station.

The controller 150 outputs the digital broadcasting data of the selected channel among the demodulated digital broadcasting data to the output unit, and stores the digital broadcasting data of all the broadcasting channels except the selected broadcasting channel in the temporary storage unit 160. Herein, although the temporary storage unit 160 may be implemented by a memory, such as dynamic random access memory (DRAM) and the like, it may be more desirable to implement the temporary storage unit 160 by a cache memory, for example, SRAM, for the purpose of effective process of operation. The temporary storage unit 160 may be included in the controller 150.

When there is a request for switching to another of the broadcasting channels serviced by the broadcasting station during the output of the selected channel, the controller 150 controls to retrieve and output the digital broadcasting data of the requested broadcasting channel among the digital broadcasting data stored in the temporary storage unit 160.

The display unit 170 outputs various display data generated from the digital broadcasting reception apparatus 100. It is advisable to manufacture the display unit 170 out of a liquid crystal display (LCD) and so on capable of sufficiently supporting the resolution of the digital broadcasting data. Herein, if the LCD is implemented in the scheme of a touch screen, the display unit 170 may function as a input unit.

Figure 3:
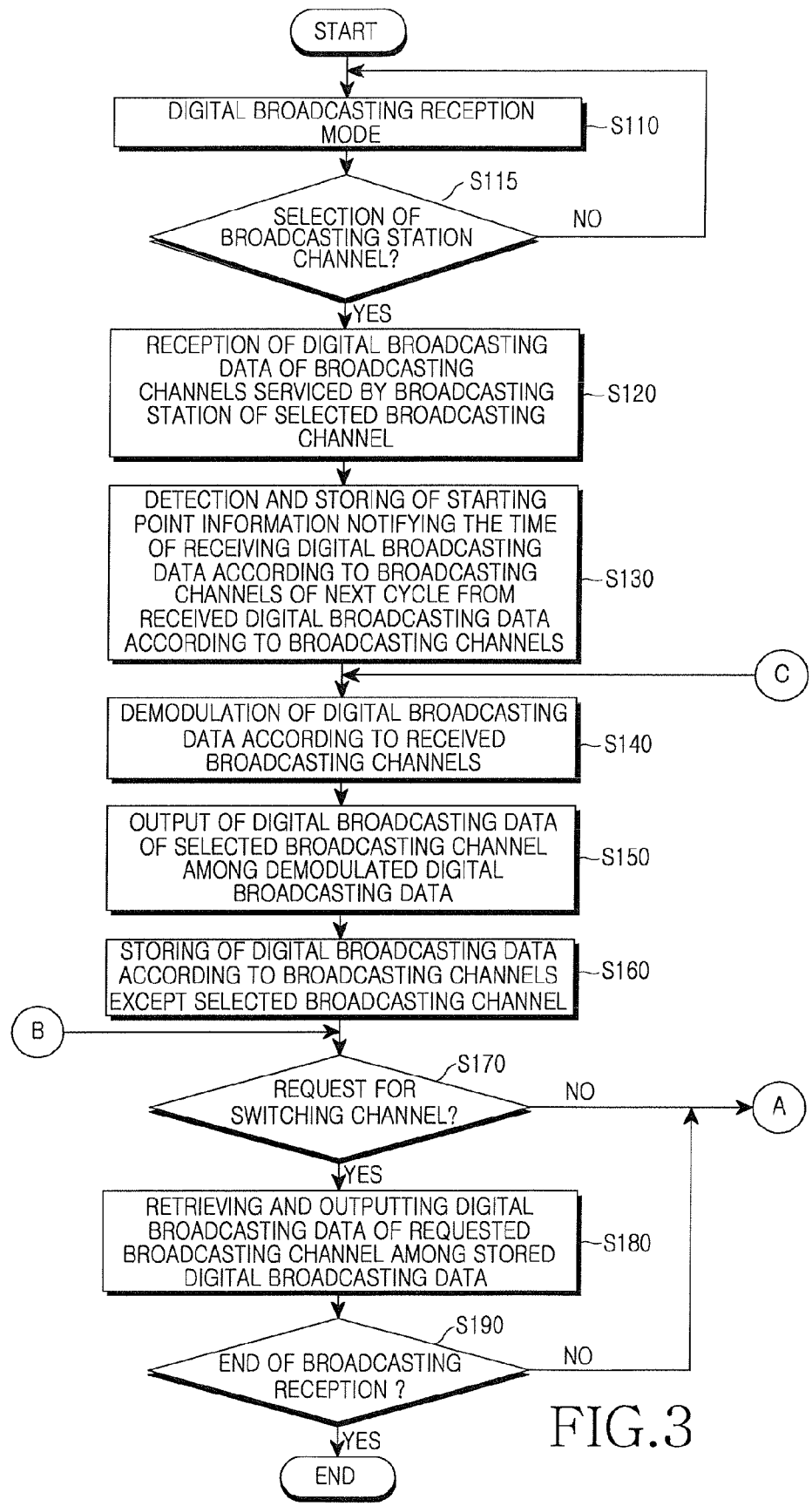
FIG. 3 and FIG. 4 are flowcharts illustrating an operational process of the digital broadcasting reception apparatus according to an exemplary embodiment of the present invention.
Figure 4:
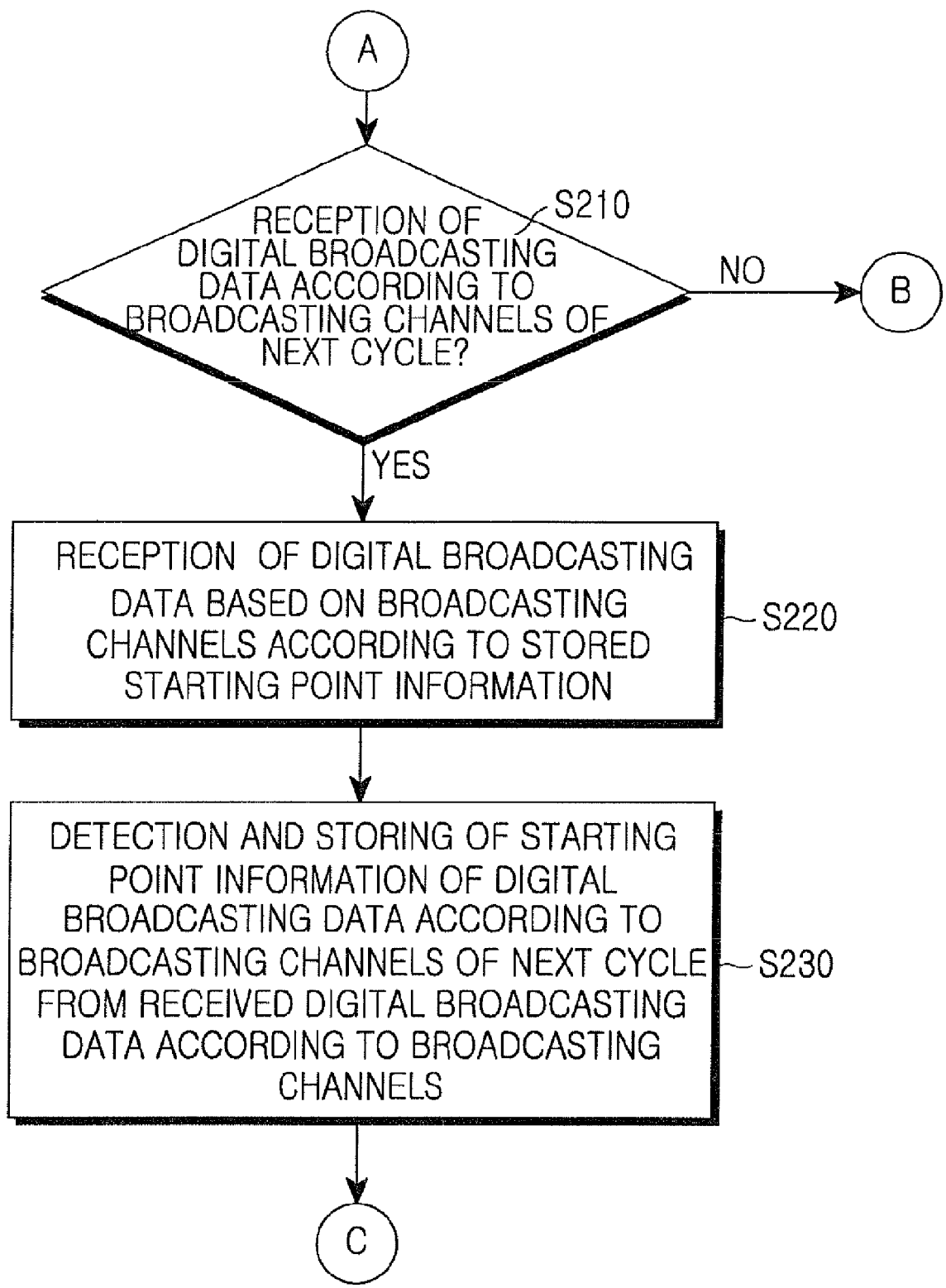

FIG. 3 and FIG. 4 are flowcharts illustrating an operational process of the digital broadcasting reception apparatus according to an exemplary embodiment of the present invention.

Referring to FIG. 2, FIG. 3 and FIG. 4 will be described below.

The controller 150 performs the digital broadcasting reception mode according to a request for receiving digital broadcasting by a user in step S110.

The controller 150 determines whether or not a broadcasting channel of a broadcasting station (e.g., KBS broadcasting station) is selected in step S115.

When the broadcasting channel is selected, the controller 150 receives the digital broadcasting data of all the broadcasting channels serviced cyclically in the scheme of time division multiplexing in a frequency band used by the broadcasting station of the selected broadcasting channel in step S120.

The controller 150 detects the starting point information notifying the time of receiving the digital broadcasting data of the broadcasting channels of the next cycle from the received digital broadcasting data and stores the information in the memory unit 140 in step S130. Since the starting point information usually is included in the header of the digital broadcasting data of each of the broadcasting channels, the controller 150 can detect the starting point information by checking the header of the digital broadcasting data of each of the broadcasting channels.

The controller 150 demodulates the received digital broadcasting data of each of the broadcasting channels through the demodulator 120 in step S140.

The controller 150 demodulates the digital broadcasting data of the selected broadcasting channel, selected in step S115, among the demodulated digital broadcasting data and outputs the data to the output unit in step S150.

The controller 150 stores the digital broadcasting data of all the broadcasting channels in the temporary storage unit 160, except the data of the selected broadcasting channel among the demodulated digital broadcasting data based on the broadcasting channels in step S160. Herein, when the digital broadcasting data based on the broadcasting channels is received according to the reception cycle of the digital broadcasting data, it is desirable for the controller 150 to delete the previously stored digital broadcasting data in the temporary storage unit 160 and update the temporary storage unit 160 with the received digital broadcasting data of the broadcasting channels.

The controller 150 determines whether or not there is a request for switching of the broadcasting channel during output of the digital broadcasting data of the selected broadcasting channel in step S170.

If there is a request for switching of the broadcasting channel as mentioned above, the controller 150 retrieves and outputs the digital broadcasting data of the requested broadcasting channel among the digital broadcasting data stored in the temporary storage unit 160 in step S180. Therefore, the controller 150 can effectively process the request for switching channels by immediately retrieving and outputting the digital broadcasting data according to the requested broadcasting channel from the temporary storage unit 160 where the data is demodulated and stored.

When the digital broadcasting data of the switched broadcasting channel is output, the controller 150 may store the digital broadcasting data of the broadcasting channels except the switched broadcasting channel among the digital broadcasting data, which is received and demodulated by the digital broadcasting receiver 110, in the temporary storage unit 160.

In the meantime, if there is no request for switching broadcasting channel during step S170, the controller 150 determines whether or not the digital broadcasting data according to the broadcasting channels of the next cycle is received in step S210. In other words, the step S210 refers to a step where the controller 150 identifies whether the present time is when the digital broadcasting data cyclically received of the broadcasting channels is received or not. If the present time is not when the digital broadcasting data of the broadcasting channels is received, the controller 150 returns to step S170.

In the case where the present time is when the digital broadcasting data of the broadcasting channels of the next cycle is received, the controller 150 receives the digital broadcasting data based on the broadcasting channels according to the starting point information notifying the time when the digital broadcasting data according to the broadcasting channels is received, wherein the starting point information has been stored in the memory unit 140 in step S220. That is to say, only when the digital broadcasting data of each broadcasting channel is received, the controller 150 is able to reduce the electricity consumption necessary for moving SRAM included in the demodulator 120.

The controller 150 detects the starting point information of the digital broadcasting data of the broadcasting channels of a next cycle from the digital broadcasting data of the broadcasting channels and stores the information in the memory unit 140, and then returns to step S140 in step S230. Herein, it is advantageous to delete the starting point information of the digital broadcasting data of the broadcasting channels of the previous cycle already stored in the memory unit 140.

As described above, in exemplary embodiments of the present invention, since it is possible to quickly switch broadcasting channel in the digital broadcasting reception apparatus employing a time division multiplexing scheme during output of the digital broadcasting, the convenience for users can be improved.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for switching broadcasting channels in a digital broadcasting reception apparatus employing a time division multiplexing scheme, which receives digital broadcasting data according to at least one of broadcasting channels serviced in a frequency band, used by each of the broadcasting stations, at a fixed cycle, the method comprising:

receiving and demodulating digital broadcasting data of a plurality of broadcasting channels serviced in a frequency band used by a broadcasting station when one of the plurality of broadcasting channels is selected;

outputting demodulated digital broadcasting data corresponding to the selected broadcasting channel among the demodulated digital broadcasting data of the plurality of broadcasting channels;

storing the demodulated digital broadcasting data of the plurality of broadcasting channels except the demodulated digital broadcasting data corresponding to the selected broadcasting channel; and when a request for switching to another broadcasting channel of the plurality of broadcasting channels is received, retrieving and outputting the stored demodulated digital broadcasting data corresponding to the another broadcasting channel of the plurality of broadcasting channels among the stored demodulated digital broadcasting data.

2. The method as claimed in claim 1, wherein the storing of the demodulated digital broadcasting data comprises updating the stored demodulated digital broadcasting data when the digital broadcasting data of the plurality of broadcasting channels is received according to a reception cycle of the digital broadcasting data.

3. The method as claimed in claim 1, wherein the demodulated digital broadcasting data of the plurality of broadcasting channels except the demodulated digital broadcasting data of the another broadcasting channel is stored when the demodulated digital broadcasting data corresponding to the another broadcasting channel is output.

4. The method as claimed in claim 1, further comprising detecting and storing starting point information notifying of a time of receiving the digital broadcasting data according to each of the plurality of broadcasting channels from the received digital broadcasting data.

5. The method as claimed in claim 4, wherein the channel starting point information is detected from a header of the received digital broadcasting data.

6. The method as claimed in claim 4, wherein the digital broadcasting data based on the plurality of broadcasting channels is received and demodulated according to the stored channel starting point information.

7. A digital broadcasting reception apparatus employing a time division multiplexing scheme, which receives digital broadcasting data of a plurality of broadcasting channels serviced in a frequency band used by each of the broadcasting stations, at a fixed cycle, the apparatus comprising:
- a digital broadcasting receiver for receiving digital broadcasting data of a plurality of broadcasting channels serviced in a frequency band used by a broadcasting station when one of the plurality of broadcasting channels is selected;
- a demodulator for demodulating the received digital broadcasting data of the plurality of channels;
- an output unit for outputting demodulated digital broadcasting data corresponding to the selected broadcasting channel among the demodulated digital broadcasting data of the plurality of broadcasting channels;
- a storage unit for storing demodulated digital broadcasting data of the plurality of broadcasting channels except the demodulated digital broadcasting data corresponding to the selected broadcasting channel; and
- a controller for, when a request for switching to another broadcasting channel of the plurality of broadcasting channels serviced by the broadcasting station is received, retrieving and outputting the stored demodulated digital broadcasting data corresponding to the another broadcasting channel of the plurality of broadcasting channels among the demodulated digital broadcasting data stored in the storage unit.

8. The apparatus as claimed in claim 7, wherein the storage unit comprises a cache memory.

9. The apparatus as claimed in claim 7, wherein the controller controls to update the digital broadcasting data stored in the storage unit according to the plurality of broadcasting channels when the digital broadcasting data based on the plurality of broadcasting channels is received according to a reception cycle of the digital broadcasting data.

10. The apparatus as claimed in claim 7, wherein the controller controls to store in the storage unit the demodulated digital broadcasting data of the plurality of broadcasting channels except the demodulated digital broadcasting data corresponding to the another broadcasting channel among the demodulated digital broadcasting data when the digital broadcasting data of the another broadcasting channel is output.

11. The apparatus as claimed in claim 7, wherein the controller controls to detect and separately store starting point information notifying of a time of receiving the digital broadcasting data according to each of the plurality of broadcasting channels from the received digital broadcasting data.

12. The apparatus as claimed in claim 11, wherein the apparatus further comprises a memory unit for storing the detected channel starting point information.

13. The apparatus as claimed in claim 11, wherein the controller detects the channel starting point information from a header of the received digital broadcasting data of the plurality of broadcasting channels.

14. The apparatus as claimed in claim 12, wherein the controller controls to receive and demodulate the digital broadcasting data based on the plurality of broadcasting channels according to the stored channel starting point information in the memory.

15. A mobile terminal for receiving digital broadcasting data, the terminal comprises:
- a digital broadcasting receiver for receiving the digital broadcasting data based on a plurality of predetermined broadcasting channels;
- a demodulator for demodulating for demodulating the digital broadcasting data;
- an output unit for outputting demodulated digital broadcasting data corresponding to the selected broadcasting channel among the demodulated digital broadcasting data of the plurality of predetermined broadcasting channels;
- a storage unit for storing demodulated digital broadcasting data of the plurality of predetermined broadcasting channels except the selected broadcasting channel; and
- a controller for, when a request for switching to another broadcasting channel of the plurality of predetermined broadcasting channels serviced by a broadcasting station is received, retrieving and outputting the stored demodulated digital broadcasting data of the requested broadcasting channel among the demodulated digital broadcasting data stored in the storage unit.

16. The mobile terminal as claimed in claim 15, wherein the storage unit comprises a cache memory.

* * * * *